United States Patent
Parker

(10) Patent No.: US 7,682,126 B2
(45) Date of Patent: Mar. 23, 2010

(54) TETHERED PROPGEN

(75) Inventor: David Joseph Parker, 4202 18th Ave. West, Bradenton, FL (US) 34205

(73) Assignee: David Joseph Parker, Bradenton, FL (US)

( * ) Notice: Subject to any disclaimer, the term of this patent is extended or adjusted under 35 U.S.C. 154(b) by 687 days.

(21) Appl. No.: 11/450,981

(22) Filed: Jun. 9, 2006

(65) Prior Publication Data

US 2008/0012345 A1 Jan. 17, 2008

(51) Int. Cl.
*F03B 13/00* (2006.01)

(52) U.S. Cl. .................. 415/3.1; 415/4.1; 415/4.3; 415/4.5; 415/906; 415/908; 416/84; 416/DIG. 4

(58) Field of Classification Search ............ 415/3.1, 415/4.1, 4.3, 4.5, 906, 908; 416/84, DIG. 4
See application file for complete search history.

(56) References Cited

U.S. PATENT DOCUMENTS

| 2,501,696 | A | * | 3/1950 | Souczek | 415/7 |
| 4,179,886 | A | * | 12/1979 | Tsubota | 415/3.1 |
| 4,383,182 | A | * | 5/1983 | Bowley | 415/7 |
| 4,524,285 | A | * | 6/1985 | Rauch | 415/3.1 |
| 4,850,190 | A | * | 7/1989 | Pitts | 60/398 |
| 4,868,408 | A | * | 9/1989 | Hesh | 415/7 |
| 6,091,161 | A | * | 7/2000 | Dehlsen et al. | 415/7 |
| 6,756,695 | B2 | * | 6/2004 | Hibbs et al. | 290/42 |
| 6,955,049 | B2 | * | 10/2005 | Krouse | 415/7 |

* cited by examiner

*Primary Examiner*—Igor Kershteyn

(57) ABSTRACT

A device is described for the conversion of energy from free flowing water into electric, hydraulic, or pneumatic power using a submersible system of turbine propellers mounted on horizontal shafts supported by chambers, each containing switchgear and/or generators and air or water ballast. The device is tethered to the seabed by a cable. Free of a rigid vertical support, the device can yaw so that water flow in any direction can be used for power generation, as in a tidal basin. In response to sensing the water velocity of the water channel, the device actively seeks a nominal water velocity, ascending or descending as necessary.

10 Claims, 4 Drawing Sheets

TETHERED PROPGEN

INVENTION BACKGROUND

1. Field of the Invention

The invention relates to a hydroelectric power generating device submerged in relatively slow moving water, as in a river or tidal basin. Keeping the device in an optimal water channel velocity during tidal cycles, as well as propeller and shaft orientation with respect to water channel flow are the chief design goals for maximizing the generating capacity factor in a river or tidal basin.

2. Description of the Prior Art

Power generation efficiency within a natural and variable medium requires that the turbine propeller maintain a perpendicular relationship to the water's direction. Past examples of river or tidal basin energy conversion devices have depth and level control in moving water that is regulated by the system's fore and aft wings. Using a system of wings for control is only effective in a dynamic environment—action and reaction. When water is at standstill no control is possible, necessary leveling and depth control is not achieved and bottoming can occur. Other tethered devices have characteristics which prevent bottoming, but are fixed in one direction, and cannot yaw to face water from opposite directions, as in a tidal basin. Additionally, tethered devices that sense only depth are not suited to tidal basin installation, as the depth, which is measured from the water surface, will vary during tidal cycles, while the elevation, which is measured from the seabed, will not. Another past approach utilized with some success is a fixed suspension from a bridge or piling or some other structural means of support. This fixed arrangement fails to satisfy the desired requirement for maximum efficiency due to its inability to maintain a perpendicular relationship to the water's direction. A fixed system precludes the elevation adjustment necessary in an open water channel. As water velocity and surface level varies due to seasonal or tidal change—a fixed system can not adjust. Fixed suspension also precludes the realization of an optimum maximum device capacity factor (ratio of actual kilowatt-hours generated—for the time considered, to the kilowatt-hours that could have been generated at continuous full power operation during the same time period). The vertical freedom of movement for any open channel energy conversion device is acutely necessary to realize a maximum generation capacity factor. What is needed is a tethered, submerged power generating device which is free to traverse up and down in elevation and yaw to orient the turbine propellers perpendicular to water flow in an environment with reversing water flow conditions.

SUMMARY OF THE INVENTION

The invention is a tethered, water velocity seeking tidal generator. The device will actively dive when the water velocity is too high for generation or ascend to seek water velocities in higher elevations. The device uses water and air ballast and drag to adjust pitch, roll and elevation. It will also remain buoyant and actively yaw 180 degrees in slack tide in order to face the approaching and receding tidal waters.

A typical tidal power generation plant achieves a capacity factor of 44% annually. This invention is capable of achieving a capacity factor of 50% or more due to its ability to seek water velocity suitable for generation.

SPECIFICATION

Figure 1:
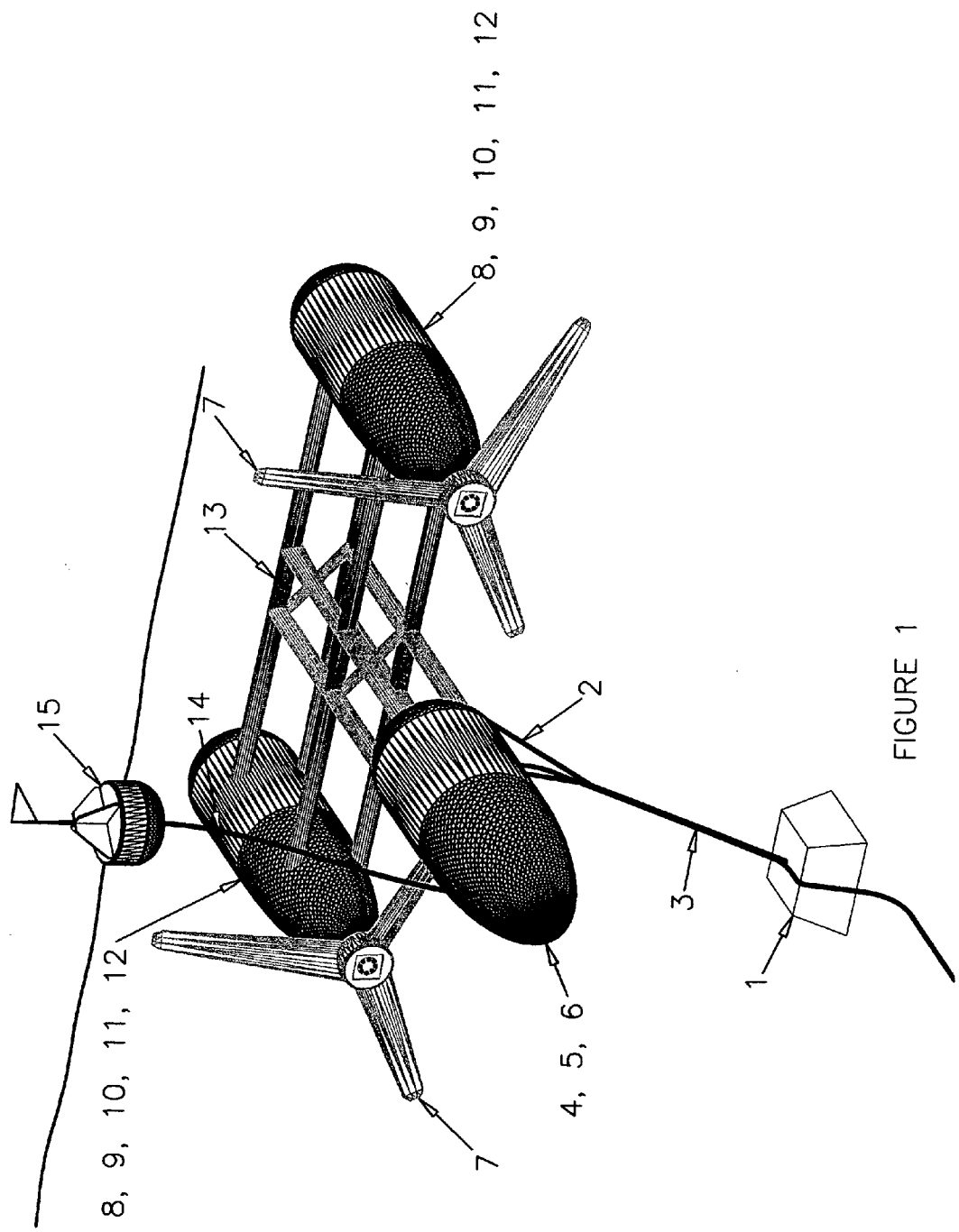
FIG. 1 is an isometric view of the generating device fixed by cable and anchored to the seabed.

FIG. 1 depicts the submerged generating device. Included items:
Item 1—the restraining anchor
Item 2—the tether
Item 3—the power and controls cable
Item 4—the front chamber containing but not showing the switchgear
Item 5—the switchgear
Item 6—the air compressor
Item 7—one of two water turbine propellers
Item 8—the two back chambers, each containing a shaft and bearings
Item 9—shaft and bearings
Item 10—speed increasing gear
Item 11—a generator
Item 12—ballast chamber
Item 13—consists of a frame which ties chambers (2) 8, and 4 together and provides structural rigidity to the power generating device
Item 14—is the air hose through which air is supplied to the compressor
Item 15—the buoy marking the location of the generating device, supporting the air hose and providing an air inlet as well as a local interface to the device.

Figure 2:
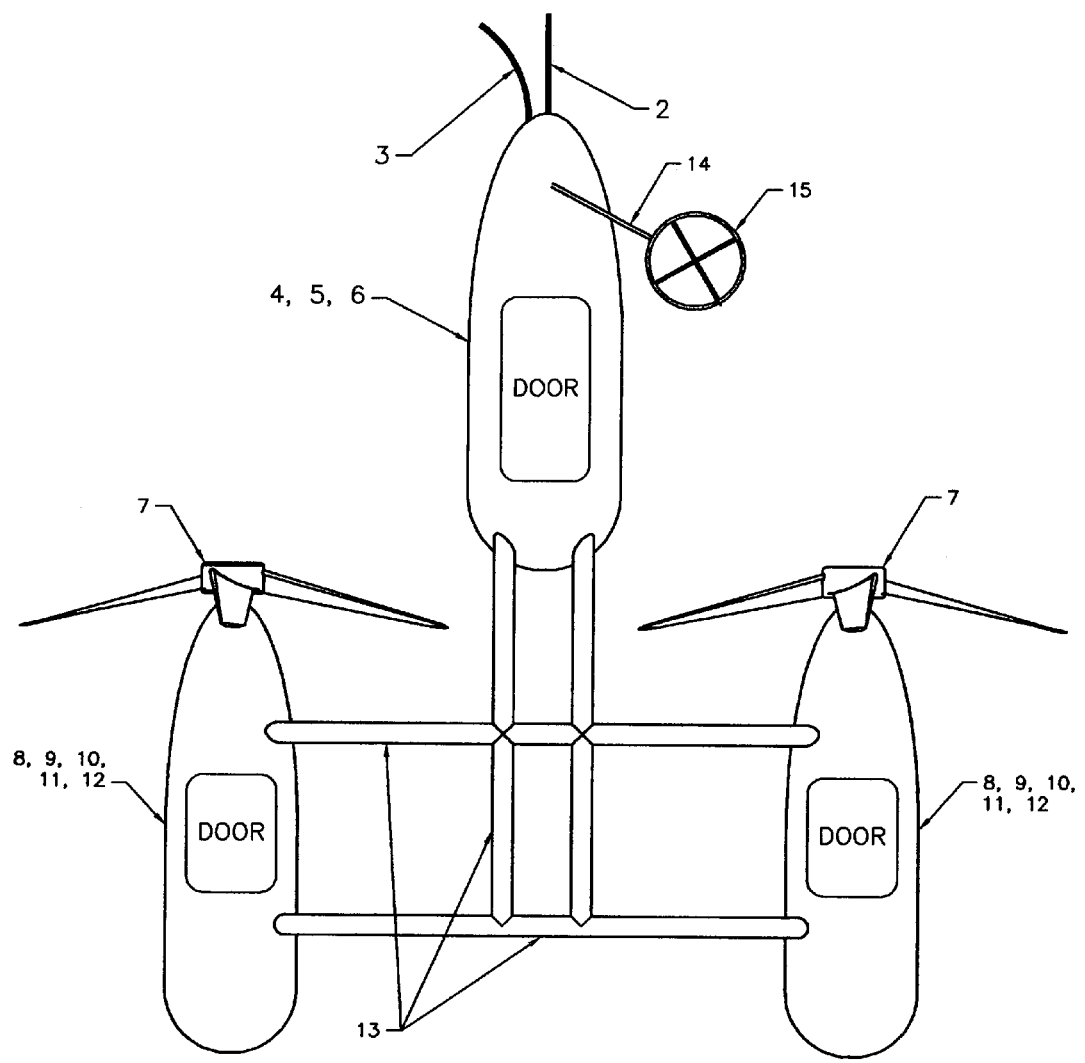
FIG. 2 is a Plan view of the generating device.

FIG. 2 depicts a plan view of the device in FIG. 1. Visible are the doors for maintenance access of the device.

Figure 3:
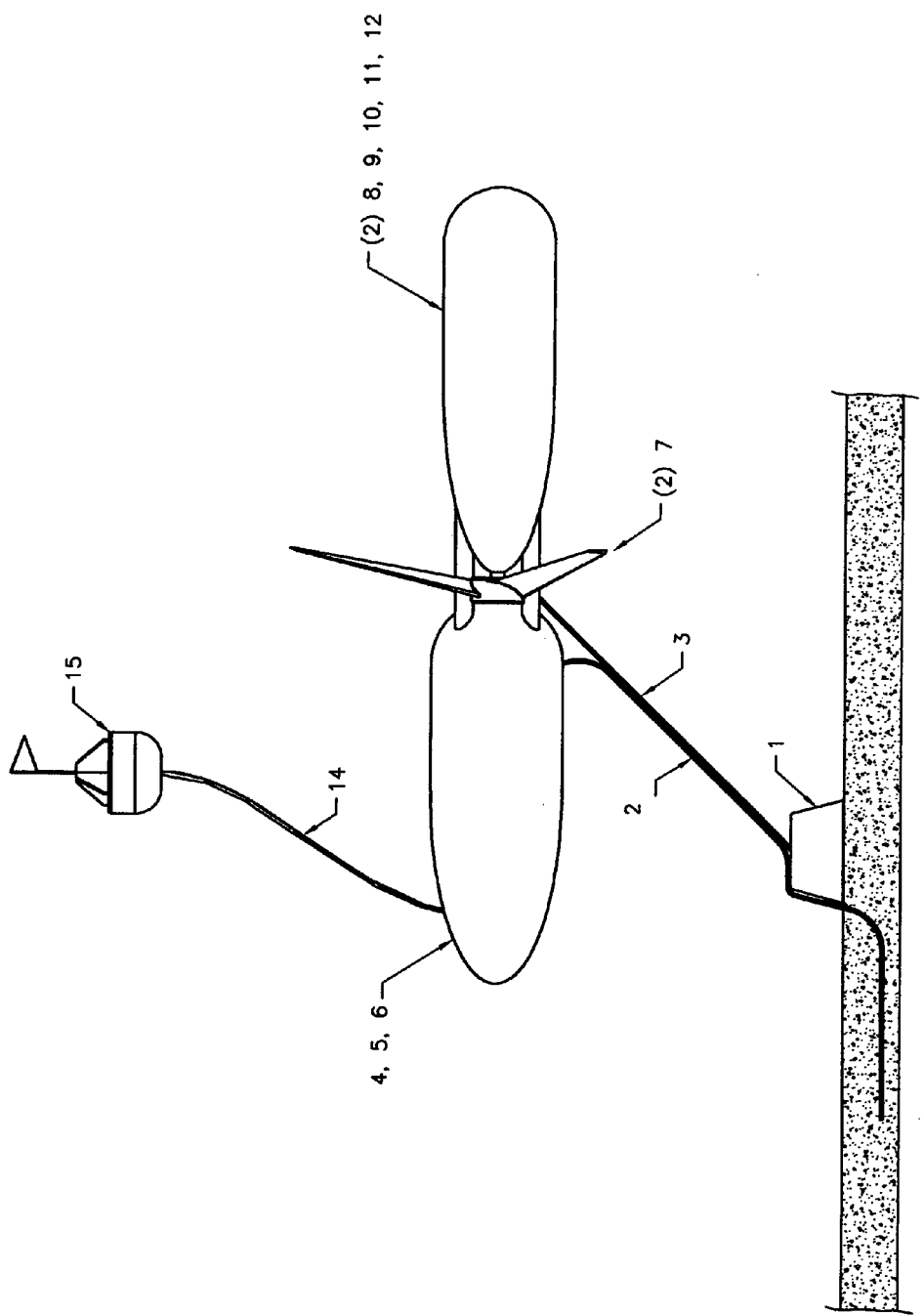
FIG. 3 is a Side elevation view of the generating device.

FIG. 3 depicts a side elevation view of the device in FIG. 1. Included in the switchgear 5 are the sensors which record operating characteristics of the device and relay them to local control. The power and control cable 3 provides an interface between local control and shore control, which allows for remote operation. Minimum and maximum water velocities are set.

The device will be at maximum elevation, which is controlled by the length of the tether 2 attached to the restraining anchor 1, during slack tide, or when water velocities are approaching zero. The device senses water velocity by means of a velocity sensor as part of the switchgear. When a minimum velocity is reached the device begins to generate power.

In order to generate power, water flows over the turbine propeller (2) 7, inducing rotation at a relatively slow rotational speed. The slow rotational speed of the propeller is increased to the synchronous speed of the generators (2) 11 by means of shafts and bearings (2) 9 coupled to speed increasing gears (2) 10. Once a tachometer in the switchgear detects that synchronous speed has been reached, the switchgear activates the generator, and power is output via the power and control cable.

As the water velocity continues to increase with the tidal action, drag forces on the two turbine propellers and three chambers force the device to a greater depth. In a water channel, the water velocity is parabolic, that is, the greatest water velocities are at a depth that is approximately ten to twenty-five percent of the total depth. The maximum elevation, controlled by the tether, is somewhat below the maximum channel velocity allowing for vessel traffic, and for ice formation in cold climates. As the device is forced down by drag, the water velocity of the channel which the device experiences decreases. The device itself always remains positively buoyant, and acts to force the device upward. If the balance of drag forces and device buoyancy bring the device to a depth in which water velocities are still above optimal levels, the device descends by taking on water ballast. Water ballast is added by pumping water from the channel into the ballast chambers. Should the descent of the device come to some predetermined minimum elevation, sensed by a depth sounder in the switchgear, the device ceases descent. If water velocities at the minimum elevation are still above predetermined maximums, the device issues a shutdown command, in which it ceases generating and activates rotor brakes. After the increase in water velocity caused by tidal action peaks, and the water velocity begins to slow, the device ascends to seek optimal water velocity. This ascension occurs either by the alleviation of drag forces through the reduction in water velocity alone, or through a combination of reduction of drag and expulsion of water ballast by compressed air from the air compressor 6, which is supplied by the air hose 14. After the device has ascended to the maximum elevation, and the water velocity has decreased below the minimum velocity, the device invokes the shutdown command, ceases generating, and the turbine propeller is braked.

As the tidal velocity continues to decrease and eventually changes direction, the device begins to yaw due to drag. The yawing action allows the device to begin to generate once the tidal velocity increases above some predetermined minimal level in the new direction. The yawing is assisted by air or water propulsion systems mounted on the rear chambers. The air or water propulsion systems are also used to eliminate cable twist. The yaw of the device is recorded using a yaw sensor in the switchgear, and if yaw is continually detected in one direction, the air or water propulsion systems allow the twist to be alleviated by forcing the device to yaw in the direction opposite the detected twist.

During operation, instabilities caused by turbulent currents or various other factors may induce roll and/or pitch in the device. This roll and/or pitch are sensed by a roll/pitch sensor in the switchgear. The device moves air or water ballast to alleviate the roll and/or pitch condition. That is, if the device is experiencing positive pitch, the front chamber will take on water ballast, and the rear chambers will force water ballast out by using compressed air. Accordingly, if the device is experiencing negative pitch, the front chamber will expel water ballast using compressed air, and the rear chambers will take on water ballast. Those skilled in the art will understand that the same rationale will be used to alleviate roll.

Power transmission and control cable 3, extend to the seabed along the restraining cable 2, and can be buried in or fixed to the seabed and extend to either other units or a control and power station either at some point in the water channel or at shore.

Figure 4:
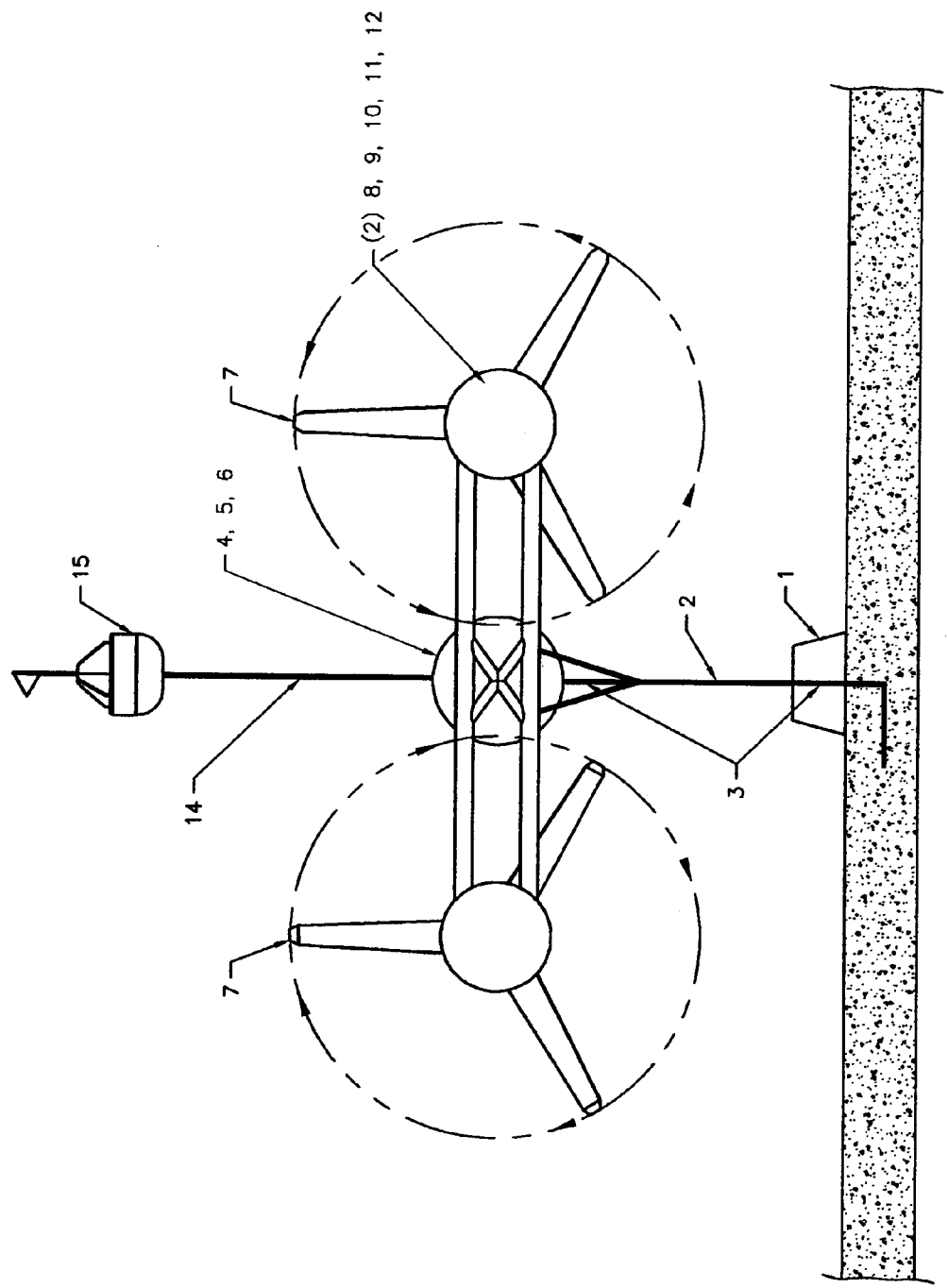
FIG. 4 is a Rear elevation view of the generating device.

FIG. 4 depicts a rear elevation view of the device in FIG. 1, and shows the rotational directions of the turbine propellers 7.

I claim:

1. An entirely submerged power generating device comprising:
    two counter-rotating, water current driven turbine propellers;
    a plurality of frame connected chambers supporting the turbine propellers, and housing the ballast, switchgear, generating, and power transmission equipment;
    said device being tethered underwater;
    means for setting a predetermined maximum water velocity and a predetermined minimum water velocity;
    means for sensing water velocity of the water channel in which said device is submerged, and;
    means operative in response to said means for sensing water velocity of the water channel in which said device is submerged, and;
    selectively invoking a protocol for adding or removing ballast to force the device to ascend or descend to seek the predetermined optimal velocity as follows:
        a. when water velocity is below nominal, the device will expel water ballast, climbing to a higher elevation in search of optimal water velocity, or;
        b. when water velocity exceeds nominal conditions, the device will take on water ballast, sinking to a lower elevation in search of optimal water velocity.

2. The submerged power generating device of claim 1, whose maximum elevation is limited by said tether, and where said maximum elevation is sufficient to avoid ice and/or vessels, and said tether further comprises a means for elongation, allowing said device to be floated on the surface of the water for maintenance purposes.

3. The submerged power generating device of claim 1, further comprising said restraining cable fixed in such a manner to allow said device to yaw to assume a propeller position perpendicular to water flow in any direction, as in a tidal basin.

4. The submerged power generating device of claim 1, further comprising a means for enabling local operation of said device at a marking buoy or remote operation at a land located position, and a means for networking said device to identical or similar devices producing electrical power transmitted by seabed cable to one or more in-stream or shore located electrical power substations.

5. The submerged power generating device of claim 1 wherein said device is capable of decoding a shutdown command, and means operative in response to said decoding of a shutdown command, for bringing the generator off line using the switchgear, and braking the turbine propeller to a standstill.

6. The submerged power generating device of claim 1, further comprising a means for recording yaw of the device, and means operative in response to recording yaw of said device, for using air or water propulsion systems to reverse yaw to alleviate cable twist should yaw in one direction continually occur; that is, excessive counter-clockwise yaw will be alleviated by clockwise motion induced by air or water propulsion systems, and excessive clockwise yaw will be alleviated by counter-clockwise motion induced by air or water propulsion systems.

7. The submerged power generating device of claim 1, wherein said turbine propeller is coupled to a shaft and bearings, said device further comprising;
    means for sensing rotational speed of said shaft, and;
    means operative in response to said sensing of rotational speed for selectively invoking a generating command or a shutdown command, and;
    means for braking said turbine propeller.

8. The submerged power generating device of claim 1 wherein said protocol comprises means for adjusting quantity of air or water ballast in said device either by expelling water ballast using compressed air, or by taking on water ballast by pumping water from the water channel into the ballast chambers.

9. The submerged power generating device of claim 1 further comprising means for detecting the distance from the seabed;
    means for setting a predetermined minimum distance from seabed, and;
    means operative in response to said sensing of minimum distance from the seabed for ceasing descent and issuing a shutdown command.

10. The submerged power generating device of claim 1 wherein said device is capable of decoding a generating command, and means operative in response to said decoding of a generating command in which occur the following:
  a. releasing the turbine propeller to freely rotate;
  b. means for sensing rotational speed of the shaft in claim 2, and;
  c. means operative in response to sensing the rotational speed of said shaft for bringing the generator on line using the switchgear.

* * * * *